Sept. 8, 1931. L. G. COPEMAN 1,822,013
UNIT FORMED PARTIALLY OF FIRED CERAMIC MATERIAL
Filed Jan. 21, 1928 2 Sheets-Sheet 1

INVENTOR.
Lloyd G. Copeman
BY
ATTORNEY.

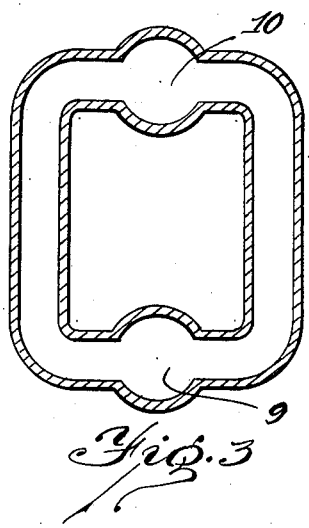
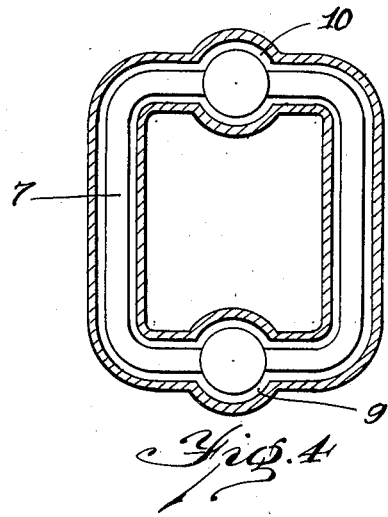
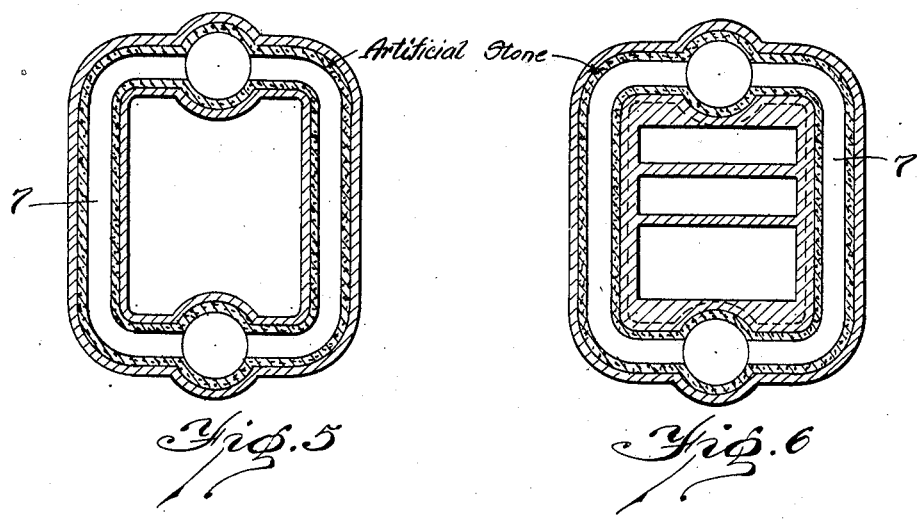

Patented Sept. 8, 1931

1,822,013

UNITED STATES PATENT OFFICE

LLOYD G. COPEMAN, OF FLINT, MICHIGAN, ASSIGNOR TO COPEMAN LABORATORIES COMPANY, OF FLINT, MICHIGAN, A CORPORATION OF MICHIGAN

UNIT FORMED PARTIALLY OF FIRED CERAMIC MATERIAL

Application filed January 21, 1928. Serial No. 248,314.

This invention relates to units formed partially of fired ceramic material and method of forming the same. It has to do particularly with cooling units forming a part of automatic refrigerating systems, but it is also equally well adapted to the formation of other units wherein the unit comprises a metallic member or reinforcement, and a face or faces of fired ceramic material.

Heretofore in the forming of cooling units, adapted to be inserted in the cooling chamber of a refrigerator, or even where cooling units have been embodied as an integral portion of the interior of the walls of the refrigerator, it has been the practice to cast or mold suitable plastic artificial stone around the refrigerant conducting coils or receiving units, and in event that sharp freezing chambers are desired to be formed in the cast cooling unit, suitable openings, adjacent the refrigerant coils or conducting members have been formed in the cooling unit, or in the walls of the integral unit, if it is a part of the interior wall or walls of the refrigerator. Such idea of cast embedding the refrigerant conducting means in artificial stone has proven very satisfactory, but in some instances has proven objectionable due to the varying porosity of the stone when set, in that moisture tends to enter the pores of the stone unless faced with a sealing material.

It is the object of the present invention to form a cooling unit, or in fact any article containing a metallic reinforcement or metallic member and having one or more of its faces formed of a fired ceramic material. This combining of a fired ceramic unit or portion of a unit, and a separate member or members, is accomplished by first molding and firing the ceramic material in the form of a shell of predetermined shape, having one or more of its faces open, when completed, to receive the metallic article or articles of suitable shape. This separate article is then secured in place by a suitable plastic material, such as artificial stone, whereby to fill-up all the space between the metallic article or articles and the ceramic shell, and thus hold the metallic article securely in place, and either in positive contact or out of positive contact with the ceramic shell.

One of the main features of my novel unit and the method of forming the same, is in connection with the formation of a cooling unit or sharp freezing chamber of the type forming a link in a mechanical refrigerating system. In the embodiment of my invention in a unit of this type, the outside shell of the sharp freezing chamber, or the entire shell of the cooling unit or container is formed of a fired ceramic material, a portion of the wall or walls of the shell being open for the reception of the refrigerant conducting coils or members, and which coils or members are adapted to be positioned in the hollow portion of the shell and the spaces therebetween filled up by a plastic artificial stone. In this event the exposed portion of the cooling unit or cooling container of any type is formed of a non-porous fired ceramic material which presents a very pleasing appearance. Furthermore, plastic stone around the refrigerant conducting member will hold such member in place whereby the stone filling and the ceramic shell will act as a heat transferring medium and will also act as an efficient holdover.

Various other features of my invention will be brought out in the specification and claims.

In the drawings:

Fig. 3 is a section taken on line 3—3 of Fig.

2 and illustrating the formation of the ceramic shell prior to the completing of the same as a cooling unit.

Fig. 4 illustrates the step of placing the metallic refrigerant receiving and conducting member in the hollow ceramic shell.

Fig. 5 is a view similar to Fig. 4 but showing the metallic member as being held in place by plastically applied artificial stone.

Fig. 6 is a view similar to Fig. 5 but showing the relative positioning of the ice cube chambers or sharp freezing chambers which are preferably formed integral with the fired ceramic shell.

Although I have illustrated the preferred embodiment of my novel method and unit formed thereby, as in connection with the cooling unit or cooling member of a refrigerating unit, it will be understood that my novel article of manufacture and the method of forming the same, may be suitably embodied in other units which include the combination of a metallic member or separate element with fired ceramic material.

Figure 1:
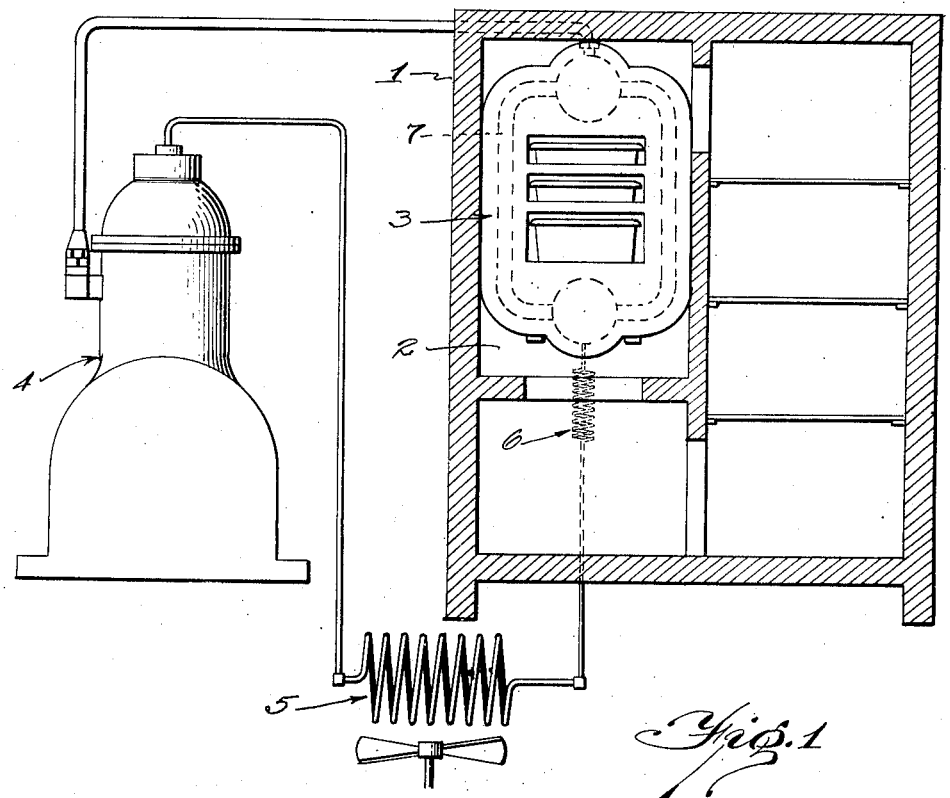
Fig. 1 is a front elevation, partly diagrammatical, illustrating my invention as embodied in the cooling unit of a domestic refrigerator.

A standard refrigerating system is diagrammatically illustrated in Fig. 1, wherein the refrigerator cabinet may be designated 1, the refrigerating chamber 2, and a suitable cooling unit positioned in the refrigerating chamber as at 3. It will be understood that such cooling unit 3 may take various forms, such as a combined container unit and cooling unit, as shown in my Patent No. 1,671,761 which was copending with this application, or may be formed as a sharp freezing unit combined integrally with the walls of the refrigerating chamber, as shown in my copending application #116,321, filed June 16, 1926.

This cooling unit, or part of a cooling unit, preferably forms a unit in the refrigerating system which includes a compressor 4, a condenser 5, a suitable refrigerant controlling member, such as a capillary tube 6, and a refrigerant expanding or evaporating unit 7, which is shown in dotted lines as being enclosed within the cooling unit 3.

Figure 2:
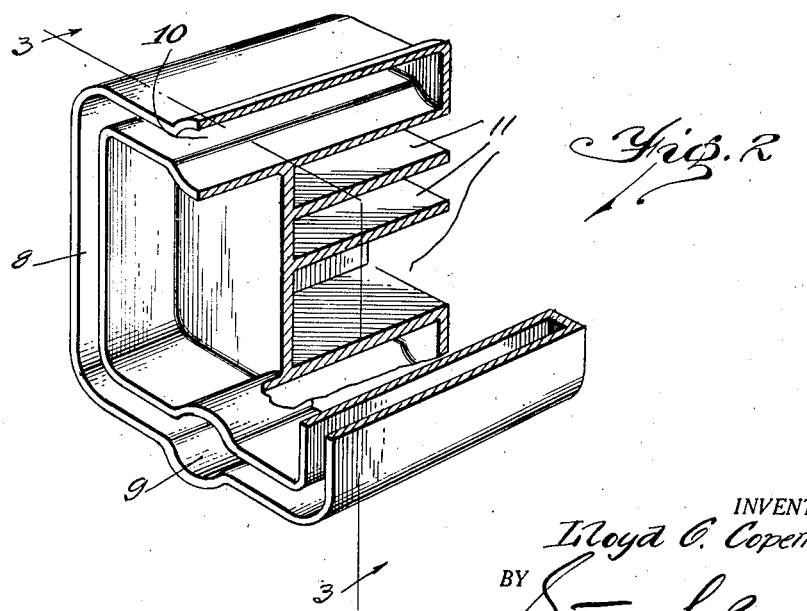
Fig. 2 is a fragmentary perspective view of a fired ceramic shell of the type such as would be used in forming the cooling unit illustrated in Fig. 1.

In forming a cooling unit such as is illustrated in Fig. 1, or any other suitable cooling unit, I preferably form the exposed surface thereof by means of a molded, fired ceramic shell, such as is illustrated in Fig. 2. In the particular embodiment of the ceramic shell, to form the cooling unit 3, as shown in Fig. 1, the shell may be molded hollow, and the rear portion of the shell is preferably open, as at 8. In forming this hollow shell, the hollow formation corresponds with the contour of the particular refrigerating unit, or other member, to be embodied in the shell, and in the embodiment shown in Fig. 1, the particular shell is shown as provided with suitable cylindrical openings 9 and 10 to receive the headers or drums of the refrigerating unit 7, as shown in dotted lines in Fig. 1. The sides of the hollow shell are also formed to receive the pipes for connecting the headers or drums of the refrigerating unit, as is also shown in dotted lines in Fig. 1. The center of the fired ceramic shell may be also formed, when molded, to provide suitable sharp freezing chambers 11.

In carrying out my novel method, I first preferably mold the shell in the particular shape desired, corresponding to the member or members to be embedded therein, and fire the same, as will be understood by those skilled in the art. Such a fired ceramic shell is shown in Fig. 3, which is a view taken on line 3—3 of Fig. 2, and showing in particular the hollow portion of the shell for receiving the refrigerating unit. In Fig. 4 the refrigerating unit 7 is shown positioned in place and ready to receive the plastic artificial stone which is preferably an oxychloride cement such as is disclosed in my aforesaid pending application #116,321.

In Fig. 5, I have shown the refrigerating unit as being held in place by the plastically applied but hardened artificial stone. In so forming my novel unit, it will be understood that the ceramic shell may form the mold wall or core for the pouring of the oxy-chloride cement or artificial stone. Of course, the fired ceramic shell becomes a permanent part of the unit, but the point is that by also forming the mold or core, it eliminates such collapsible or removable molds and cores as have been used in the past.

It will thus be seen that I have provided a novel method of forming articles or completed units which have combined in their make-up a fired ceramic shell or unit and a separate member or members. Whether the separate member or members serve as reinforcements, or serve as refrigerant conducting means, or any other function, by my novel method such member or members will be positioned in place and will serve their respective functions with the same efficiency as if they had been cast embedded and present in the ceramic unit or shell when the same was fired. This is accomplished in a very simple manner whereby instead of completely embedding the metallic or other member or members in the ceramic clay, the ceramic shell or unit is first fired, and the metallic or other member or members inserted in the hollow portion or portions of the ceramic shell and then held positively in place by a plastically applied or poured artificial stone. The metallic members are thus securely and positively held in place, they are surrounded by two forms of stone, one naturally hardened by inherent action, and the other hardened by firing. The interior artificial stone is protected from moisture by the fired ceramic shell, and it will be obvious that any grade of stone may be used regardless of its porosity. Furthermore, in case of forming an article of manufacture, such as a cooling unit or portion thereof, the heat conducting properties and the holdover properties of the unfired stone are retained intact as the fired ceramic material may be formed of materials having the particular conducting or holdover properties required.

It will be understood that I am not claiming broadly the idea of a unit or a cooling unit, in a refrigerating system, formed of stone, as this has been claimed in my other copending applications, but that I am here claiming the idea of a cooling unit formed of two kinds of stone, that is, an exterior unit formed of a fired ceramic material, and an interior portion formed of artificial stone which is inherently set. It will also be understood that I am broadly claiming the idea of a unit, and the method of forming the same, which includes in its combination fired ceramic material, and a metallic or other member or members embedded in the same, wherein the locating or embedding is accomplished by a plastically applied material adapted to set without firing.

What I claim is:

1. A refrigerating apparatus, comprising a cooling unit formed of stone, one or more of the exposed surfaces of said unit being formed of a fired ceramic material, a refrigerant conducting coil positioned in heat conducting relation with said fired ceramic material and held in such position by means of plastically applied material adapted to harden without firing.

2. A refrigerating apparatus, comprising a cooling unit formed of stone, exposed surfaces of the said unit being formed of a hollow fired ceramic shell and refrigerant conducting means embedded in heat conducting relation with said fired ceramic material by means of a plastically applied unfired material.

3. A refrigerating apparatus, comprising a sharp freezing chamber having one or more of its surfaces formed of a fired ceramic material in the shape of a hollow shell, refrigerant conducting means positioned in said hollow shell, and held in such shell by means of plastically applied material, adapted to set without firing, and a compressor and refrigerating mechanism connected in series with said refrigerant conducting means for circulating a volatile refrigerant therethrough.

4. Refrigerating apparatus comprising in combination refrigerating mechanism, a cooling unit having a portion of its exposed surface formed of a fired ceramic shell, artificial stone inserted in said shell in plastic condition but allowed to harden without firing, and conduit passageways in said hardened stone connected in series with said refrigerating mechanism for circulating a refrigerant through said cooling unit.

5. In a refrigerating apparatus of the type having refrigerating mechanism, a refrigerant receiving and circulating means connected in series with said refrigerating mechanism, a hollow shell of fired ceramic material positioned around said refrigerant receiving and circulating means, and a mass of unfired artificial stone in the space between said shell and said refrigerant receiving and circulating means.

6. A refrigerating apparatus, comprising a cooling unit having one or more exposed surfaces formed of a fired ceramic material, refrigerant receiving and conducting means positioned in heat conducting relation with said fired ceramic material, and refrigerating mechanism connected in series with said refrigerant receiving and circulating means.

7. As a new article of manufacture, a unit having an exposed surface or surfaces formed of a fired ceramic material, and a reenforcing element held in proximity to said fired ceramic material by an unfired plastically applied material.

8. As a new article of manufacture, a unit having some of its exposed surfaces formed of a hollow, fired ceramic material, and a defining element or elements held in place within the hollow portion or portions thereof by means of an unfired plastically applied material.

9. As a new article of manufacture, a unit having its exposed surface or surfaces formed of a substantially non-porous ceramic material, and a defining and reenforcing metallic element or elements positioned adjacent the walls of said ceramic material, said element or elements being held in said position by means of a plastically applied material adapted to harden without firing.

10. As a new article of manufacture, a unit comprising in combination a metallic member for defining and reenforcing a portion of said unit, and a fired ceramic outer shell corresponding in part to the shape of said metallic member, a portion of said fired ceramic shell being open for the insertion of said metallic member, and said metallic member being positioned and held within said ceramic shell by means of a plastic ceramic material adapted to harden without firing.

11. A refrigerating apparatus, comprising a cooling unit formed of an outer shell of material fused in its manufacture, said shell being non-porous and preformed, refrigerant receiving and conducting means positioned within said shell and in heat conducting relation therewith, and a mass of unfired plastically applied artificial stone adjacent the walls of said shell, said refrigerant means being embedded in said stone.

12. A refrigerating apparatus, comprising a cooling unit having one or more exposed surfaces formed of a preformed material, said material being fused in its manufacture to make the same non-porous, refrigerant receiving and conducting means positioned in heat conducting relation with said preformed material, and a mass of plastically applied material allowed to harden without firing positioned adjacent said preformed material, said refrigerant receiving and circulating means being embedded in said plastically applied material, and said plastically applied material being such as to serve as a hold-over for the refrigerating means.

In testimony whereof I affix my signature.

LLOYD G. COPEMAN.